(12) United States Patent
Tamma et al.

(10) Patent No.: US 7,360,522 B2
(45) Date of Patent: Apr. 22, 2008

(54) SYSTEM AND METHOD FOR OPERATING A TURBO-CHARGED ENGINE

(75) Inventors: Bhaskar Tamma, Bangalore (IN); Jennifer Ann Topinka, Niskayuna, NY (US); Roy James Primus, Niskayuna, NY (US); Richard John McGowan, Slippery Rock, PA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/492,237

(22) Filed: Jul. 25, 2006

(65) Prior Publication Data

US 2008/0022966 A1   Jan. 31, 2008

(51) Int. Cl.
*F02B 3/00* (2006.01)
*F02M 43/00* (2006.01)
(52) U.S. Cl. .................. 123/299; 123/304; 701/104
(58) Field of Classification Search ............. 123/299, 123/300, 304, 305, 478, 480, 486; 701/104
See application file for complete search history.

(56) References Cited

U.S. PATENT DOCUMENTS

| | | | | |
|---|---|---|---|---|
| 5,195,470 A * | 3/1993 | Ikeura | ................ | 123/90.15 |
| 5,280,773 A | 1/1994 | Henkel | | |
| 5,740,775 A | 4/1998 | Suzuki et al. | | |
| 6,182,632 B1 * | 2/2001 | Yanagihara | ............. | 123/299 |
| 6,302,080 B1 | 10/2001 | Kato et al. | | |
| 6,354,269 B1 | 3/2002 | Saito et al. | | |
| 6,382,177 B1 | 5/2002 | Saito | | |
| 6,470,849 B1 | 10/2002 | Duffy et al. | | |
| 6,505,601 B1 | 1/2003 | Jorach et al. | | |
| 6,901,747 B2 | 6/2005 | Tashiro et al. | | |
| 7,054,734 B2 * | 5/2006 | Todoroki et al. | ......... | 701/105 |
| 2007/0044752 A1 * | 3/2007 | Tamma et al. | ........... | 123/299 |

FOREIGN PATENT DOCUMENTS

| | | |
|---|---|---|
| DE | 3735169 | 4/1988 |
| DE | 3936619 | 5/1991 |
| DE | 19602065 | 7/1997 |
| DE | 19639172 | 4/1998 |
| DE | 19857785 | 6/2000 |
| DE | 19953932 | 5/2001 |
| DE | 10105755 | 8/2002 |
| EP | 0706592 | 7/1997 |
| EP | 0849459 | 6/1998 |
| JP | 11082030 | 3/1999 |
| JP | 1 223 329 A2 * | 12/2001 |
| JP | 2002/115593 | 4/2002 |
| WO | WO0263155 | 8/2002 |
| WO | WO2004/099598 | 11/2004 |

\* cited by examiner

*Primary Examiner*—Willis R. Wolfe
*Assistant Examiner*—Johnny H. Hoang
(74) *Attorney, Agent, or Firm*—Fletcher Yoder

(57) ABSTRACT

In certain embodiments, there is provided a method of providing a first fuel injection schedule having one or more injections per cylinder per compression stroke at a first discrete power level selected from a plurality of discrete power levels of an engine. The method further includes providing a second fuel injection schedule having a plurality of injections per cylinder per compression stroke at a second discrete power level selected from the plurality of discrete power levels of the engine, wherein the first and second fuel injection schedules comprise different injection characteristics from one another.

25 Claims, 9 Drawing Sheets

SYSTEM AND METHOD FOR OPERATING A TURBO-CHARGED ENGINE

BACKGROUND

The invention relates generally to a system and method for operating a turbo-charged compression-ignition engine and, more specifically, for reducing specific fuel consumption and engine exhaust emissions.

In a compression-ignition engine, such as a diesel engine, a fuel injection system injects fuel (e.g. diesel) into compressed air within each of the engine cylinders to create an air-fuel mixture that ignites due to the heat and pressure of compression. Unfortunately, engine efficiency, power output, fuel consumption, exhaust emissions, and other operational characteristics are less than ideal. In addition, conventional techniques to improve one operational characteristic often worsen one or more other operational characteristic. For example, attempts to decrease specific fuel consumption often cause increases in various exhaust emissions. Vehicle exhaust emissions include pollutants such as carbon monoxide (CO), nitrogen oxides (NOx), sulfur oxides (SOx), particulate matter (PM), and smoke generated due to incomplete combustion of fuel within the combustion chamber. The amount of these pollutants varies depending on the fuel-air mixture, compression ratio, injection timing, ambient conditions, engine output power, and so forth.

BRIEF DESCRIPTION

In accordance with one aspect of the present technique, a method includes providing a first fuel injection schedule having one or more injections per cylinder per compression stroke at a first discrete power level selected from a plurality of discrete power levels of an engine. The method further includes providing a second fuel injection schedule having a plurality of injections per cylinder per compression stroke at a second discrete power level selected from the plurality of discrete power levels of the engine, wherein the first and second fuel injection schedules comprise different injection characteristics from one another.

In accordance with another aspect of the present technique, a method includes performing a first injection schedule of a fuel injection into an engine cylinder at a first discrete power level of an engine to reduce specific fuel consumption, or nitrogen oxide emissions. The method further includes performing a second injection schedule of the fuel injection into the engine cylinder at a second discrete power level of the engine to reduce particulate matter emissions.

In accordance with another aspect of the present technique, a system includes a controller configured to perform a first injection schedule of a fuel injection into an engine cylinder at a first discrete power level of an engine and, configured to perform a second injection schedule of the fuel injection into the engine cylinder at a second discrete power level of the engine.

In accordance with another aspect of the present technique, a system includes a compression-ignition engine, a power control mechanism comprising a plurality of discrete notches; and a fuel-injection system coupled to the compression-ignition engine, wherein the fuel-injection system is configured to inject a pilot fuel amount followed by a majority fuel amount per cylinder per compression stroke at a first discrete notch of the plurality of discrete notches, and configured to inject a plurality of substantially equal fuel amounts per cylinder per compression stroke at a second discrete notch of the plurality of discrete notches, wherein the first discrete notch is higher than the second discrete notch.

DRAWINGS

These and other features, aspects, and advantages of the present invention will become better understood when the following detailed description is read with reference to the accompanying drawings in which like characters represent like parts throughout the drawings, wherein:

FIG. 1 is a diagram illustrating an embodiment of a medium speed turbocharged engine, such as a locomotive power unit, having fuel injection strategy logic features;

FIGS. 2, 3, and 4 are diagrams illustrating embodiments of fuel injection strategy logic features;

DETAILED DESCRIPTION

Figure 1:
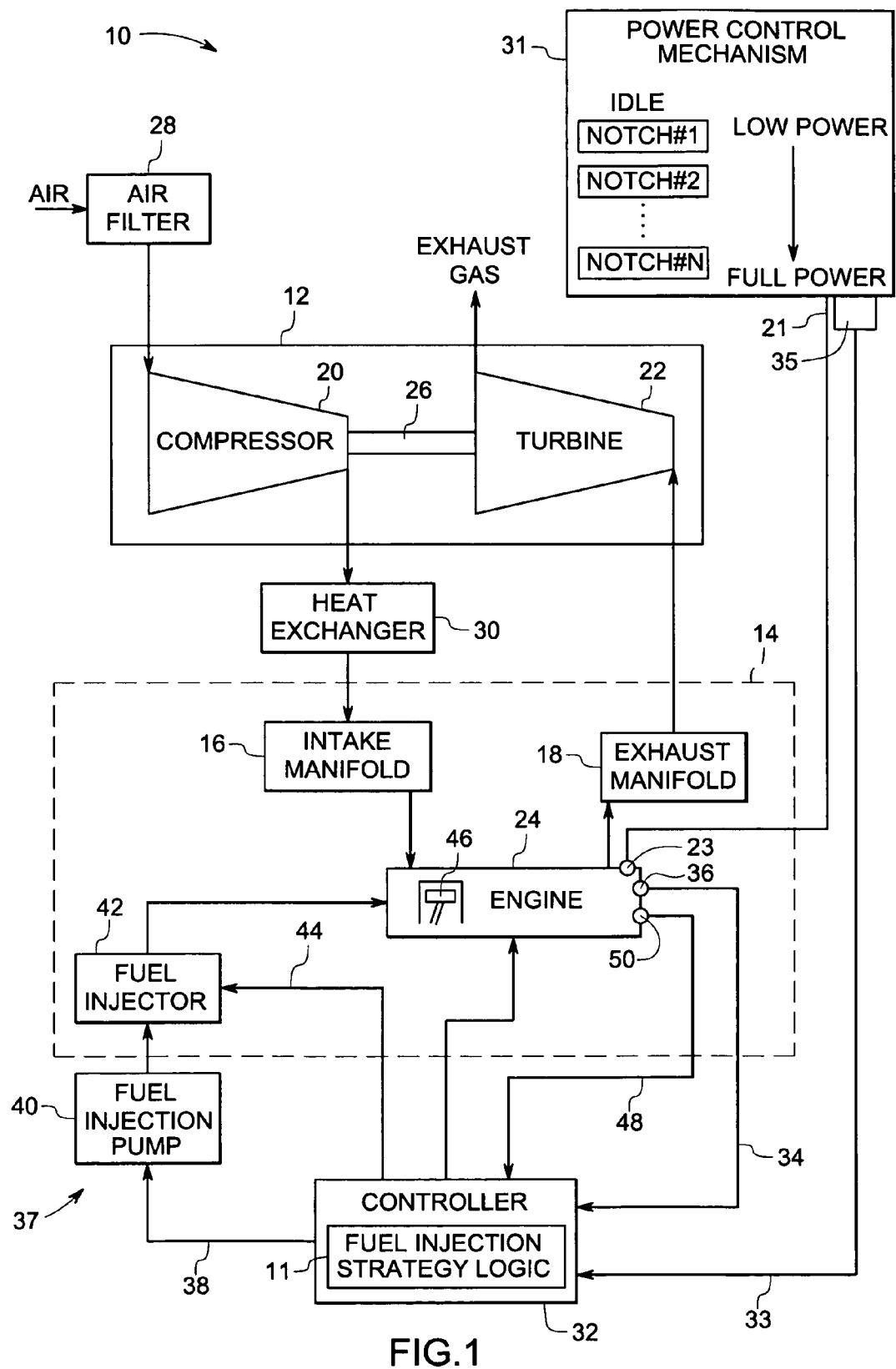

Referring to FIG. 1, a turbocharged system 10 having fuel injection strategy logic 11 is illustrated in accordance with certain embodiments of the present technique. In the illustrated embodiment, the turbocharged system 10 is a medium speed engine such as a locomotive power unit. In certain other embodiments, the power unit may be used for other medium speed engine applications. The locomotive power unit 10 includes a turbocharger 12 and a compression-ignition engine, e.g. diesel engine 14.

As discussed in further detail below, embodiments of the present technique provide monitoring and control features, such as sensors and control logic, to control engine exhaust emissions and specific fuel consumption (SFC) within the locomotive power unit 10. Embodiments of the monitoring and control features may include different fuel injection techniques at different discrete power levels. The different fuel injection techniques may include single fuel injections, multiple substantially equal fuel injections, multiple different fuel injections, pilot plus main fuel injections, and so forth. These different fuel injection techniques enable control of both emissions and SFC over the full range of engine operation. For example, at a first discrete power level of the engine, the nitrogen-oxide emissions are controlled or the specific fuel consumption is reduced by splitting fuel injection of a predetermined quantity into a pilot fuel injection and an advanced or retarded main fuel injection during a second half of a compression stroke and around top dead center position of the compression stroke of the engine 14. At a second discrete power level of the engine, particulate matter emissions are reduced by performing a plurality of substantially equal duration fuel injections during a second half of a compression stroke and around top dead center position of the compression stroke of the engine 14. The first discrete power level and the second discrete power level are selected from a plurality of discrete power levels of the engine. It should be noted that the first discrete power level is a power level equal to or greater than an intermediate power level of the plurality of discrete power levels, while the second power level is a power level equal to or less than the intermediate power level of the plurality of discrete power levels. For the overall duty cycle of the engine, nitrogen oxide emissions or specific fuel consumption are reduced. In accordance with embodiments of the present technique, the second half of a compression stroke relates to a crank angle of 90 degrees before top dead center of the compression stroke. The injection operation at the first discrete power level includes splitting the fuel injection into the pilot fuel injection and the main fuel injection, providing larger fuel quantity in the main injection event, advancing or retarding the main injection event by a predetermined value, and adjusting timing between the pilot injection and the main injection. The injection operation at the second discrete power level includes performing a plurality of substantially equal duration injections of fuel into the engine cylinder, each substantially equal duration injection performed at predetermined intervals.

The illustrated engine 14 includes an air intake manifold 16 and an exhaust manifold 18. The turbocharger 12 includes a compressor 20 and a turbine 22 and is operated to supply compressed air to the intake manifold 16 for combustion within a cylinder 24. The turbine 22 is coupled to the exhaust manifold 18. The exhaust gases ejected from the exhaust manifold 18 are expanded through the turbine 22, thereby forcing rotation of a turbocharger shaft 26 connected to the compressor 20. The compressor 20 draws in ambient air through an air filter 28 and provides compressed air to a heat exchanger 30. The temperature of air is increased due to compression through the compressor 20. The compressed air flows through the heat exchanger 30 such that the temperature of air is reduced prior to delivery into the intake manifold 16 of the engine 14. In one embodiment, the heat exchanger 30 is an air-to-water heat exchanger, which utilizes a coolant to facilitate removal of heat from the compressed air. In another embodiment, the heat exchanger 30 is an air-to-air heat exchanger, which utilizes ambient air to facilitate removal of heat from compressed air. In yet another embodiment, the heat exchanger 30 utilizes a combination of a coolant and ambient air to facilitate removal of heat from compressed air.

The power unit 10 also includes a controller 32. In one embodiment, the controller 32 is an electronic logic controller that is programmable by a user. In another embodiment, the controller 32 is an electronic fuel injection controller for the engine 14. The controller 32 receives a crank angle signal 34 from a crank angle sensor 36 provided to detect crank angle (in degrees) of a crank shaft of the engine 14. The controller 32 is configured to control the operation of a fuel injection system 37. The controller 32 may be operable to produce a fuel injection pressure signal 38 to control operation of a plurality of fuel injection pumps 40 of the fuel injection system 37. The pumps 40 drive a plurality of fuel injectors 42 for injecting fuel into the plurality of cylinders 24 of the engine 14. In the illustrated embodiment, the fuel injector 42 is an electrically actuated fuel injector. The fuel injector 42 injects fuel into the engine cylinder 24 as a function of a fuel injection signal 44 received from the controller 32. The fuel injection signal 44 may include waveforms that are indicative of duration of fuel injection, fuel injection pressure, desired fuel injection timing, quantity of fuel to be injected into the cylinder 24, or the like. A piston 46 is slidably disposed in each cylinder 24 and reciprocates between a top dead center and a bottom dead center position. A power control mechanism 31 is configured to receive a power signal 21 from a power sensor 23 configured to detect power of the engine 14. A power control mechanism 31 is configured to regulate the engine power via the controller 32 depending on the operating conditions. In the illustrated embodiment, the power control mechanism 31 includes a plurality of discrete power settings, or "notches," for example, (notch 1, notch 2, . . . , notch N). In the illustrated example, notch 1 may be indicative of a low power condition of the engine, and notch N may be indicative of a full power condition of the engine.

The controller 32 receives a speed signal 48 from a speed sensor 50 configured to detect speed of the engine 14. The controller 32 also receives a power signal 33 from a power sensor 35 configured to detect the discrete notch position of the power control mechanism 31. The controller 32 is configured to produce the fuel injection signal 44 to control the operation of plurality of fuel injectors 42 based on the crank angle signal 34, the engine speed signal 48, and the power signal 33.

Figure 2:
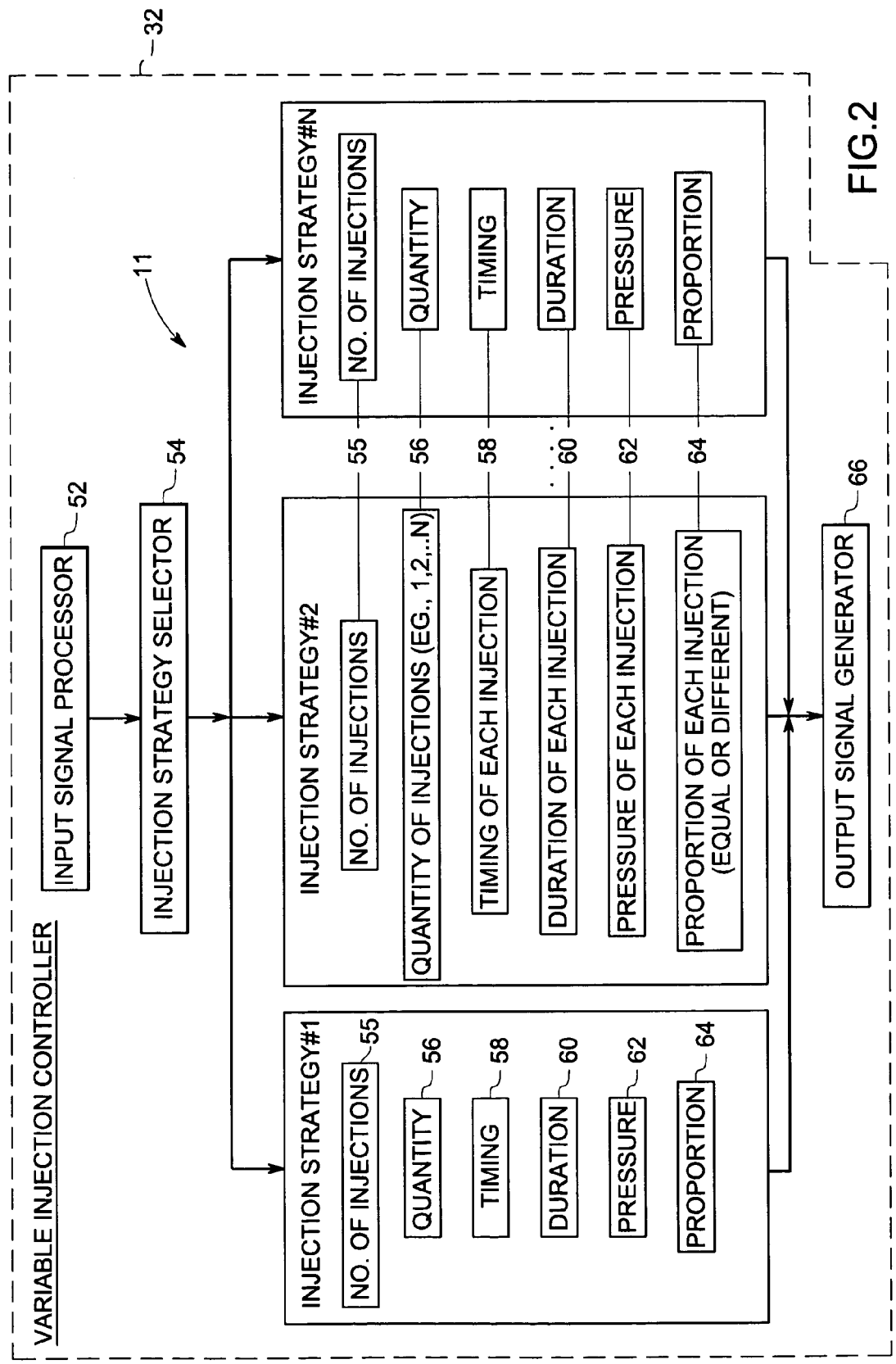

Referring now to FIG. 2, the controller 32 having fuel injection strategy logic 11 is illustrated in accordance with an exemplary embodiment of the present invention. The controller 32 includes an input signal processor 52 configured to receive the crank angle signal from the crank angle sensor, the speed signal from the speed sensor, the power signal from the power sensor, and perform various processing operations relating to determination of a fuel injection strategy. An injection strategy selector 54 receives an output signal from the input signal processor 52 and is configured to select the fuel injection strategy based on the output signal from the inputs signal processor 52. In the illustrated embodiment, the injection strategy selector 54 selects a particular injection strategy from a plurality of injection strategies, for example, injection strategy 1, injection strategy 2 . . . , injection strategy N, based on an output signal from the input signal processor 52. Each injection strategy includes data indicative of number of injections 55, total quantity of fuel to be injected 56, timing of each fuel injection 58, duration of each fuel injection 60, fuel injection pressure 62, and proportion of each fuel injection 64, or the like. The selector 54 selects the particular injection strategy and transmits a signal indicative of the injection strategy to an output signal generator 66. The output signal generator 66 is operable to produce the pressure signal to control the operations of the plurality of fuel injection pumps. Also as discussed above, the fuel injector injects fuel into the engine cylinder as a function of the fuel injection signal received from the output signal generator 66 of the controller 32.

Figure 3:
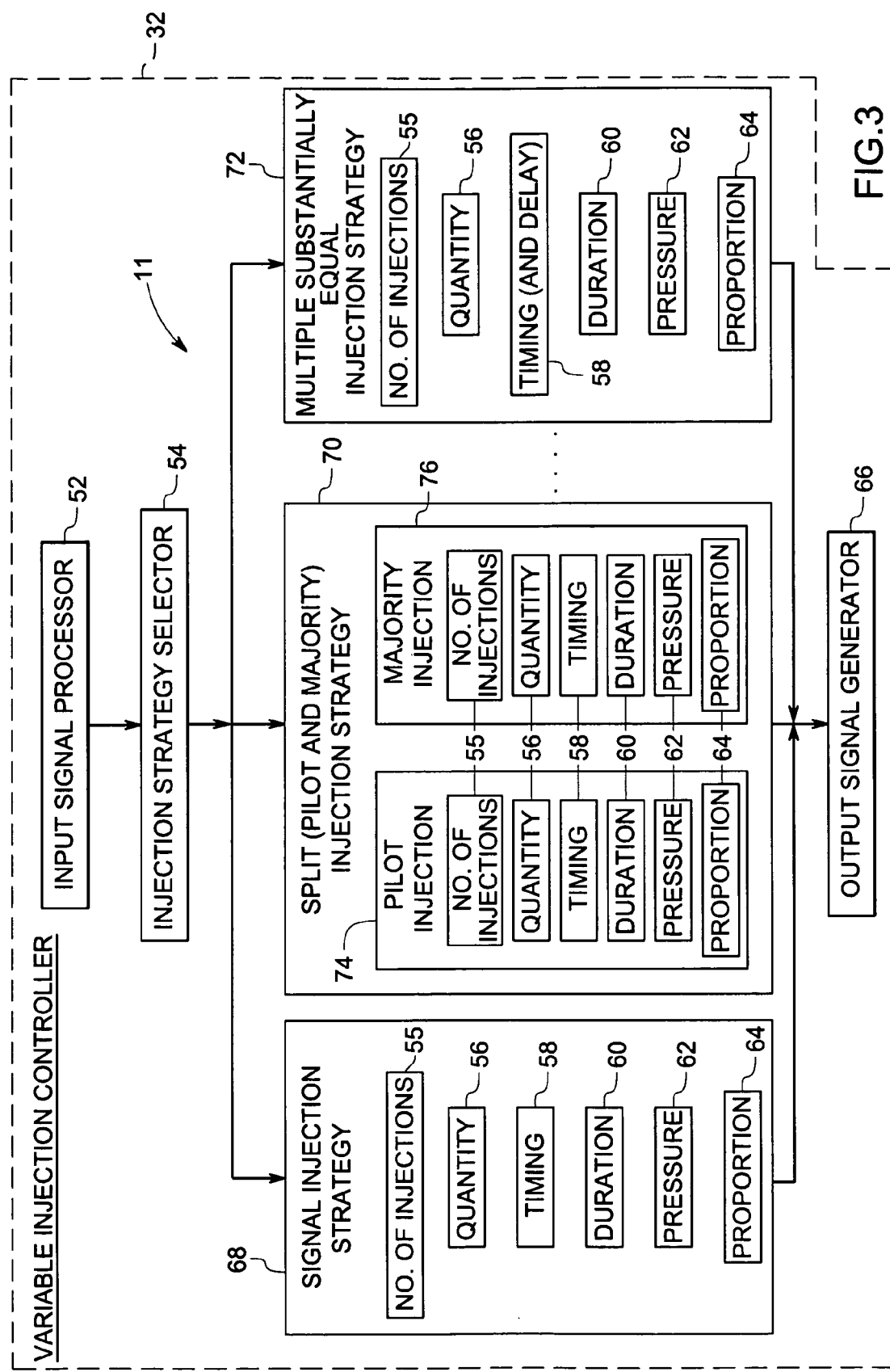

Referring to FIG. 3, the controller 32 having fuel injection strategy logic 11 is illustrated in accordance with an exemplary embodiment of the present invention. The controller 32 includes the input signal processor 52 configured to receive the crank angle signal from the crank angle sensor, the speed signal from the speed sensor, the power signal from the power sensor, and perform various processing operations relating to determination of a fuel injection strategy. The injection strategy selector 54 receives an output signal from the input signal processor 52 and is configured to select the fuel injection strategy based on the output signal from the inputs signal processor 52. In the illustrated embodiment, the injection strategy selector 54 selects a particular injection strategy from a plurality of injection strategies, for example, a single injection strategy 68, a split injection strategy 70, and a multiple substantially equal injection strategy 72, based on an output signal from the input signal processor 52. The split injection strategy 70 includes a pilot injection 74 and a majority injection 76. Details of the split injection strategy are explained in greater detail below with reference to subsequent figures. Each injection strategy may include data indicative of number of injections 55, total quantity of fuel to be injected 56, timing of each fuel injection 58, duration of each fuel injection 60, fuel injection pressure 62, and proportion of each fuel injection 64, or the like. The selector 54 selects the particular injection strategy and transmits a signal indicative of the injection strategy to an output signal generator 66. The output signal generator 66 is operable to produce the pressure signal to control the operations of the plurality of fuel injection pumps. Also as discussed above, the fuel injector typically injects fuel into the engine cylinder as a function of the fuel injection signal received from the output signal generator 66 of the controller 32.

The controller 32 is configured to perform a first injection schedule of the fuel injection into the engine cylinder at a first discrete power level of the engine to reduce specific fuel consumption or pollutant emissions, e.g., nitrogen oxide emissions. For example, the first injection schedule may include the split injection strategy 70, which may include a pilot fuel injection followed by a majority fuel injection at the first discrete power level corresponding to a discrete notch position in a mid to upper range of a plurality of notches of the power control mechanism. In addition, the controller 32 is configured to perform a second injection schedule of the fuel injection into the engine cylinder at a second discrete power level of the engine to reduce particulate emissions of the engine. For example, the second injection schedule may include the multiple substantially equal injection strategy 72, which may include a plurality of substantially equal duration injections at a second discrete power level corresponding to a discrete notch position in a low to mid range of a plurality of notches of the power control mechanism. As mentioned previously, the first and second power levels are selected from a plurality of discrete power levels of the engine. The first injection schedule and the second injection schedule are explained in greater detail below.

Figure 4:
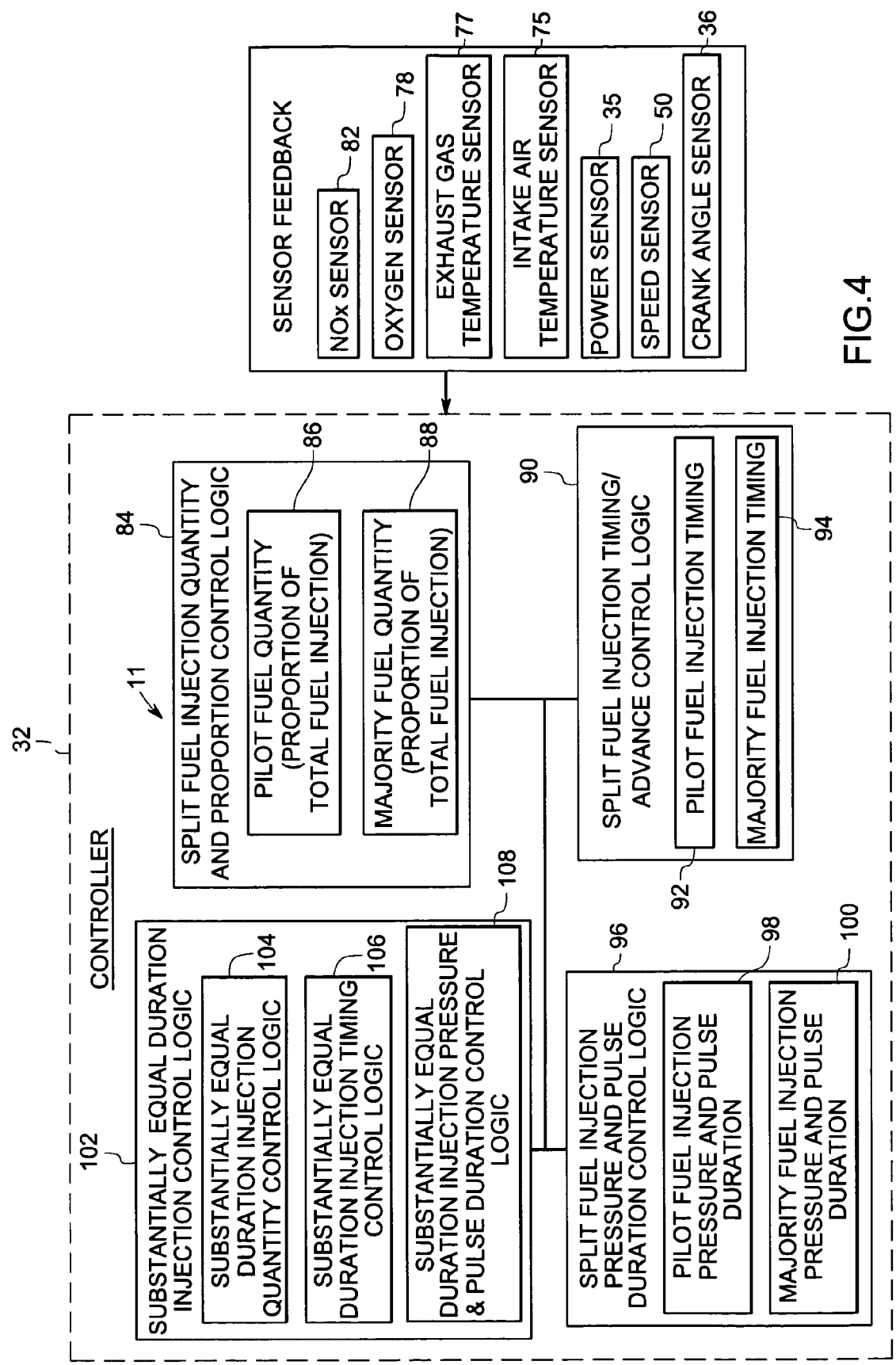

Referring to FIG. 4, the controller 32 having fuel injection strategy logic 11 is illustrated in accordance with exemplary embodiments of the present invention. As illustrated, the controller 32 receives sensor signals from a plurality of sensors, such as the crank angle sensor 36, the speed sensor 50, the power sensor 35, an intake air temperature sensor 75, an exhaust gas temperature sensor 77, an oxygen sensor 78, and a nitrogen oxide (NOx) sensor 82. The intake air temperature sensor 75 may be configured to detect temperature of air (in degrees or Kelvin) fed to the intake manifold. The exhaust gas temperature sensor 77 may be configured to detect the temperature of exhaust gas (in degrees or Kelvin) ejected from the exhaust manifold. The oxygen sensor 78, and the NOx sensor 82 may be configured to detect quantity of oxygen, and oxides of nitrogen respectively in the exhaust gas. The controller 32 includes a split fuel injection quantity and proportion control logic 84 that enables the controller 32 to inject a first quantity of fuel (e.g., pilot fuel injection) 86 into the engine cylinder 24 before the piston reaches top dead center position of the compression stroke. For example, a pilot fuel injection quantity of less than 10% of total fuel injection quantity may be injected into the engine cylinder before the top dead center of the compression stroke. The split fuel injection quantity and proportion control logic 84 also enables the controller 32 to inject a second quantity of fuel (e.g., majority/main fuel injection) 88 into the engine cylinder when the piston is in the vicinity of the top dead center position of the compression stroke. For example, main fuel injection quantity of greater than 90% of the total fuel injection quantity may be injected into the engine cylinder 24 when the piston position is in vicinity of the top dead center of the compression stroke.

The controller 32 also includes a split fuel injection timing/advance control logic 90 that enables the controller 32 to inject the pilot fuel injection quantity into the engine cylinder at a first predetermined time 92 before the piston reaches top dead center position of the compression stroke. For example, pilot fuel injection is performed when the piston position is in the range of 20 to 90 degrees before the top dead center of the compression stroke. The split fuel injection timing/advance control logic 90 also enables the controller 32 to inject the main fuel injection quantity into the engine cylinder at a second predetermined time 94 when the piston is proximate to the top dead center position of the compression stroke. In certain exemplary embodiments, "proximate" refers to piston position in the range of 5 degrees before or after the top dead center of the compression stroke. For example, main fuel injection may be performed when the piston position is in the range of less than 5 degrees before the top dead center of the compression stroke. In another example, the main fuel injection may be performed when the piston is in the range of 5 degrees after the top dead center of the compression stroke.

In the illustrated embodiment, the controller 32 further includes a split fuel injection pressure and pulse duration control logic 96 that enables the controller 32 to control the pressure and pulse duration of the pilot fuel injection 98. The split fuel injection pressure and pulse duration control logic 96 also enables the controller 32 to control the pressure and pulse duration of the main fuel injection 100. The controller 32 further includes a substantially equal duration injection control logic 102 having a substantially equal duration injection quantity control logic 104, a substantially equal duration injection timing control logic 106, and a substantially equal duration injection pressure and pulse duration control logic 108. The logic 102, 104, 106 enables the controller 32 to control the quantity, timing, pressure, and pulse duration of substantially equal duration fuel injections. The logic 102, 104, 106 enables the controller 32 to perform the second fuel injection schedule, i.e., the plurality of substantially equal duration injections into the engine cylinder at a predetermined time during the second half of a compression stroke and when the piston of the engine cylinder is proximate to the top dead center of the compression stroke. In certain exemplary embodiments, the plurality of substantially equal duration injections may include one or more equal duration injections and remaining injections of duration slightly deviating from the equal duration injections to achieve the desired power. In one example, three substantially equal duration injections of fuel are performed at a predetermined time during the second half of a compression stroke and when the piston of the engine cylinder is proximate the top dead center of the compression stroke. The first and second injection may be of equal duration and the third injection may be of duration slightly deviating from the first and second injection. Similarly any number of examples may be envisaged. In certain other examples, the number of substantially equal duration injections may vary depending on the discrete power level of the engine.

As discussed above in the illustrated embodiment, the controller 32 is configured to control the fuel injection quantity, timing, pressure, proportion, and pulse duration based on the output from the plurality of sensors. Although in the illustrated embodiment, the controller operation is explained in relation to one engine cylinder 24, in other embodiments the controller operation is applicable to multiple engine cylinders 24.

Figure 5:
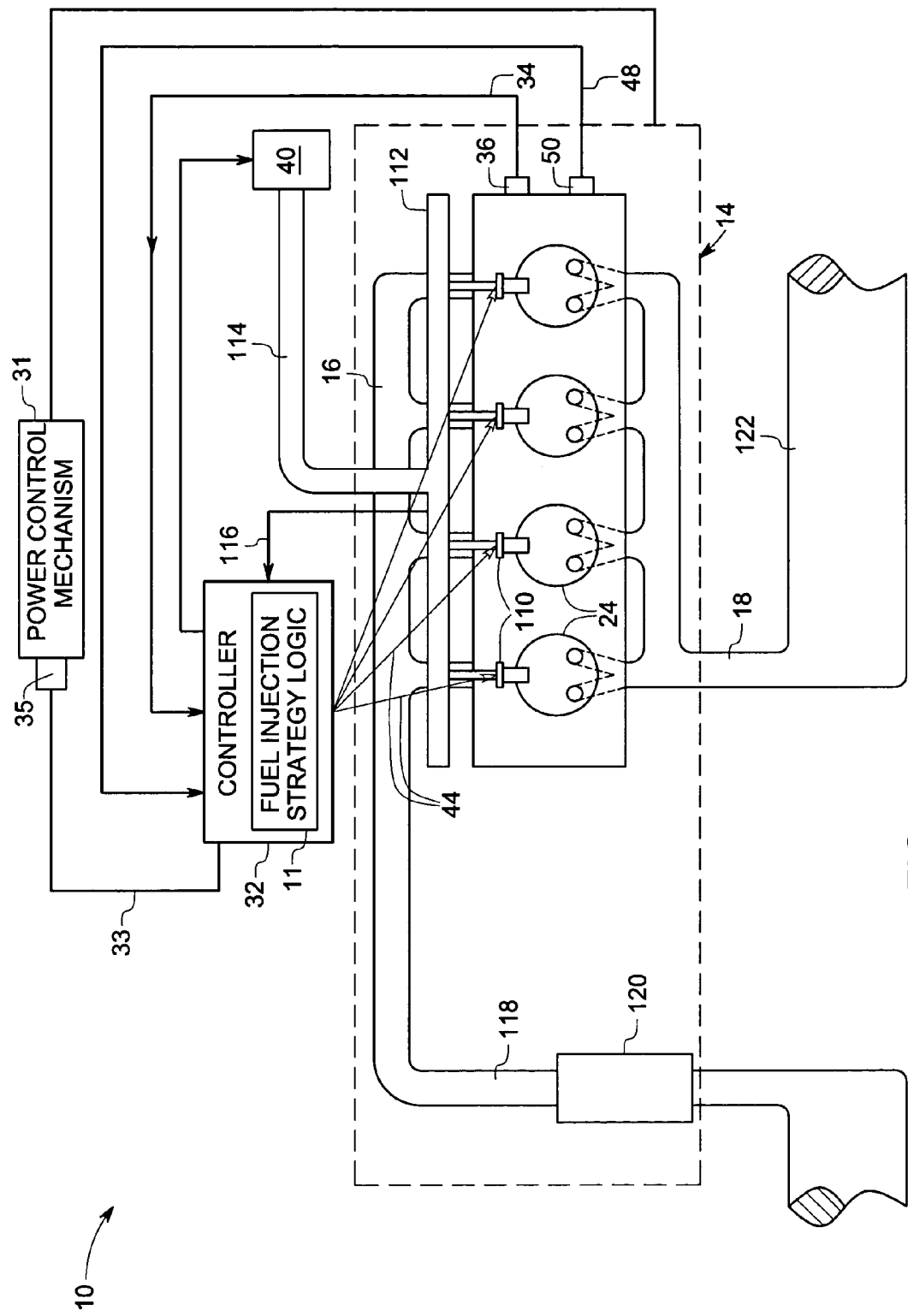
FIG. 5 is a diagram illustrating an embodiment of a multi-cylinder internal combustion engine having fuel injection strategy logic features.

Referring to FIG. 5, the locomotive power unit 10 having a multi-cylinder arrangement of the engine 14 is illustrated in accordance with certain embodiments of the present technique. The fuel injectors each include a fuel injection valve 110 disposed in fluid communication with a respective cylinder 24. In the illustrated embodiment, the engine 14 includes four cylinders 24 and four fuel injection valves 110, respectively. However, other numbers (e.g., 6, 8, 10, 12, etc.) and configurations of cylinders 24 and fuel injection valves 110 are within the scope of the present technique. The fuel injection valves 110 are provided to inject fuel into a combustion chamber of each cylinder 24. The fuel injection valves 110 are coupled to a high pressure common rail 112 configured to pressurize the fuel to a preselected pressure. The high pressure common rail 112 is coupled to the fuel injection pump 40 via a fuel supply pipe 114. The common rail 112 may be provided with a pressure sensor for detecting a fuel pressure in the common rail 112 and transmitting a pressure signal 116 corresponding to the detected fuel pressure to the controller 32. The fuel pressure in the common rail 112 is maintained at a predetermined value depending on the operating condition of the engine 14 by actuating the fuel injection pump 40. In certain embodiments, the controller 32 is configured to produce the fuel injection signal 44 to control the operation of plurality of fuel injectors based on the crank angle signal 34, engine speed signal 48, and the power signal 33. In other embodiments, the power unit may have a plurality of common rails 112 and fuel injection pumps 40.

The intake manifold 16 is coupled to the combustion chambers of the respective cylinders 24. The intake manifold 16 is coupled to an intake pipe 118. The intake air temperature sensor may be provided in the intake pipe 118. A heat exchanger 120 may be provided in the intake pipe 118 to cool the intake air through the intake pipe 118. The exhaust manifold 18 is coupled to the combustion chambers of respective cylinders 24. The exhaust manifold 18 is coupled to an exhaust pipe 122. The plurality of sensors such as the exhaust gas temperature sensor, the oxygen sensor, the CO sensor, and the NOx sensor may be coupled to the exhaust pipe 122.

As discussed above, the controller 32 receives the crank angle signal 34 from the crank angle sensor 36 provided to detect crank angle of the engine 14. The controller 32 may be operable to produce the fuel injection signal 44 to control operation of the fuel injectors. The controller 32 also receives the speed signal 48 from the speed sensor 50 configured to detect speed of the engine 14. As discussed above, in the illustrated embodiment, the controller 32 is configured to control the fuel injection quantity, timing, proportion, pressure and pulse duration based on the output from the plurality of sensors. The usage of high pressure common rail 112 along with electrically actuated fuel injector enables the controller 32 to provide flexibility in fuel injection rate, number of fuel injections, the fuel injection quantity, timing, proportion, pressure, and pulse duration. The controller 32 also receives a power signal 33 from a power sensor 35 configured to detect the discrete notch position of the power control mechanism 31. The controller 32 is configured to produce the fuel injection signal 44 to control the operation of the plurality of fuel injectors 42 based on the crank angle signal 34, the engine speed signal 48, and the power signal 33. In accordance with the embodiments of the present technique, the fuel injection operation is applicable from low load to full load conditions of the engine.

For a single shot fuel injection, if the fuel injection timing is advanced, the specific fuel consumption is reduced and the exhaust gas emission is increased. In accordance with the aspects of the present technique, the fuel injection is split into the pilot fuel injection and the main fuel injection with advanced or retarded timing around top dead center position of the compression stroke of the engine 14 at higher power levels. The pilot fuel injection and main fuel injection with advanced timing facilitates specific fuel consumption at higher power levels. Alternately, the pilot fuel injection and main fuel injection with retarded timing facilitates NOx emission reduction. Atomization of fuel is enhanced due to split injection and may be further promoted by increasing the injection pressure of the fuel. The fuel is more uniformly distributed in the combustion chamber and the air utilization within the combustion chamber is enhanced. Smaller quantity of pilot injection facilitates prevention of adherence of fuel to cylinder walls. As a result, the nitrogen oxide emission is substantially controlled or the specific fuel consumption is reduced. In accordance with aspects of the present technique, the fuel injection is split into a plurality of substantially equal duration injections during the second half of the compression stroke and when the piston is proximate to the top dead center of the compression stroke of the engine at low to intermediate power levels. Each substantially equal duration injection is performed at predetermined intervals. As a result, particulate emission is substantially reduced.

Figure 6:
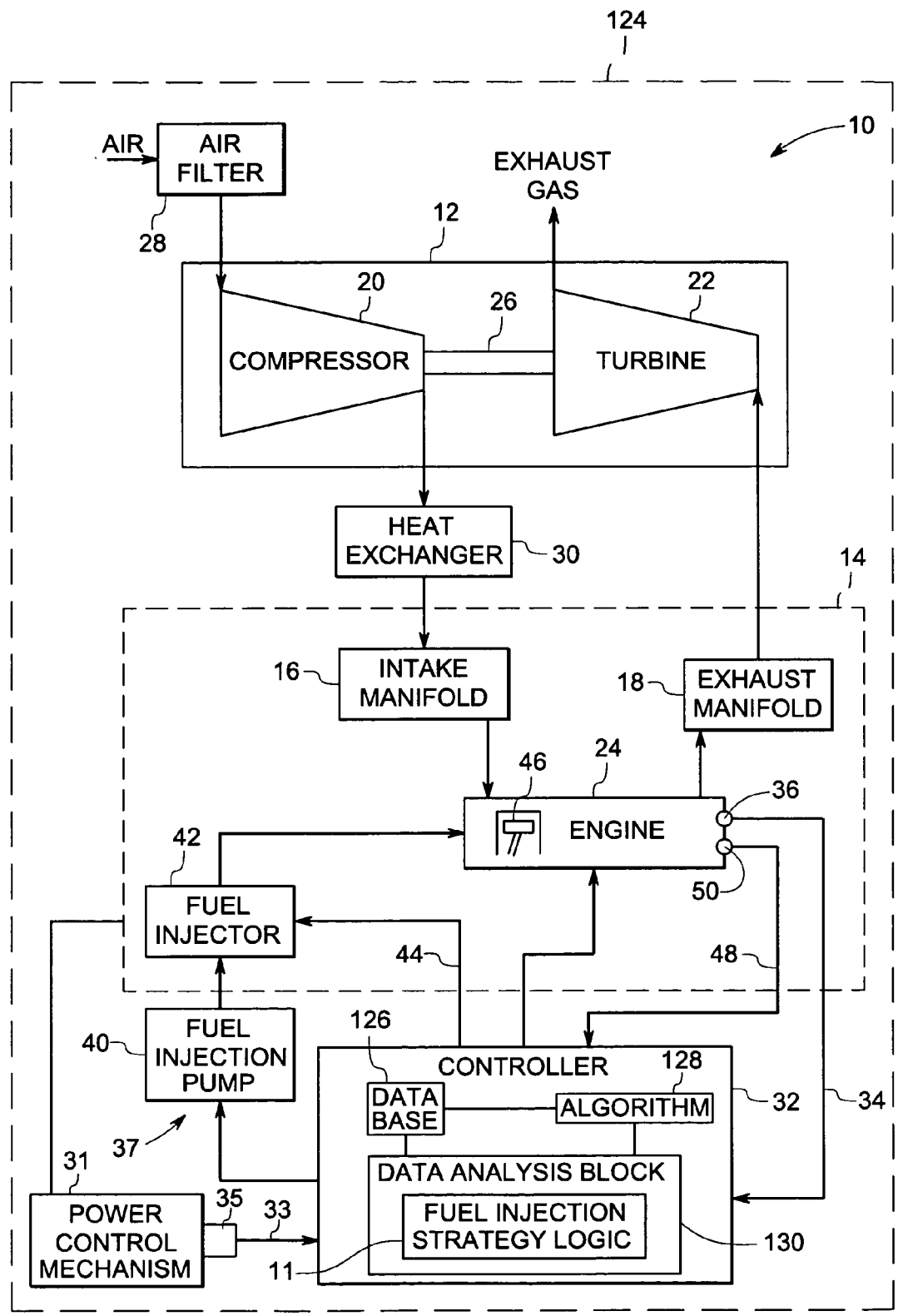
FIG. 6 is a diagram illustrating an embodiment of a system incorporating a turbocharged engine, such as a locomotive power unit, having fuel strategy logic features.

Referring to FIG. 6, one embodiment of the locomotive power unit 10 is illustrated. As illustrated above, the power unit 10 includes the turbocharger 12 and the diesel engine 14. The power unit 10 may be used for driving a system 124. The system 124 may include locomotive engine, automobile engine, marine engine, or the like. The power unit 10 includes the controller 32. The controller 32 receives the crank angle signal 34 from the crank angle sensor 36 provided to detect crank angle of the engine 14. The controller 32 may be operable to produce the fuel injection signal 44 to control operation of the plurality of fuel injectors 42. The controller 32 also receives the speed signal 46 from the speed sensor 50 configured to detect speed of the engine 14. The controller further receives the power signal 33 from the power sensor 35 configured to detect notch position of the power control mechanism 31 configured to control the engine power.

In the illustrated embodiment, the controller 32 may further include a database 126, an algorithm 128, and a data analysis block 130. The database 126 may be configured to store predefined information about the power unit 10. For example, the database 126 may store information relating to crank angle, engine speed, engine power, intake air temperature, exhaust gas temperature, exhaust gas composition, or the like. The database 126 may also include instruction sets, maps, lookup tables, variables, or the like. Such maps, lookup tables, instruction sets, are operative to correlate characteristics of the pilot injection, the main injection, and the plurality of substantially equal duration injections to specified engine operation parameters such as engine speed, engine power, crank angle, common rail pressure, desired fuel quantity, or the like. Furthermore, the database 126 may be configured to store actual sensed/detected information from the above-mentioned sensors. The algorithm 128 facilitates the processing of signals from the above-mentioned plurality of sensors.

The data analysis block 130 may include a variety of circuitry types, such as a microprocessor, a programmable logic controller, a logic module, etc. The data analysis block 130 in combination with the algorithm 128 may be used to perform the various computational operations relating to determination of fuel injection rate, number of fuel injections, the fuel injection quantity, timing, pressure and pulse duration, time interval between the pilot injection and the main injection, electrical current of the injector waveform, or a combination thereof. Any of the above mentioned parameters may be selectively and/or dynamically adapted or altered relative to time. At higher power levels, the controller 32 may be configured to control the nitrogen oxide emission or the specific fuel consumption by performing the pilot injection at the first predetermined time before the piston reaches the top dead center of the compression stroke and by further performing the advanced or retarded main fuel injection at the second predetermined time after the first predetermined time when the piston is proximate the top dead center of the compression stroke. At low to intermediate power levels, the controller 32 may be configured to reduce emission of particulate matter by performing substantially equal duration injections at a predetermined time during the second half of the compression stroke and when the piston of the engine cylinder is proximate to the top dead center of the compression stroke.

Figure 7:
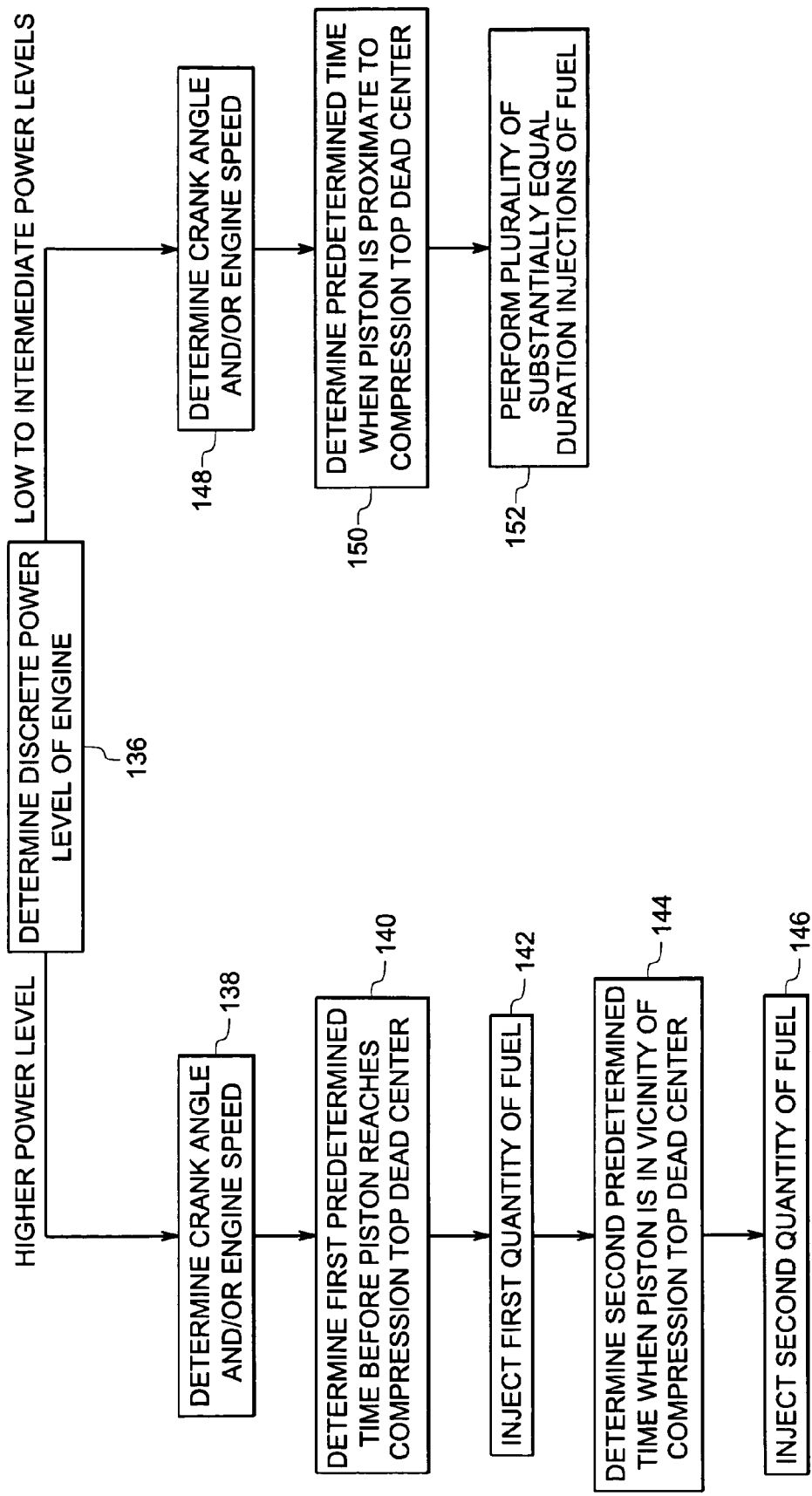
FIG. 7 is a flow chart illustrating an embodiment of a process of injecting fuel within a turbocharged engine.

Referring now to FIG. 7, this figure is a flow chart illustrating one embodiment of a process of injecting fuel within a turbocharged engine of FIG. 1 in accordance with aspects of the present technique. In the illustrated embodiment, the controller 32 determines the power level of the engine based on the power signal 33 from the power sensor 35 configured to detect the discrete notch position of the power control mechanism 31 as represented by step 136. The controller 32 determines the first discrete power level of the engine corresponding to a discrete notch position in a mid to upper range of the plurality of notches of the power control mechanism or the second discrete power level of the engine corresponding to a discrete notch position in a low to mid range of the plurality of notches of the power control mechanism. For higher power levels of the engine 14, the controller 32 determines the crank angle and engine speed as represented by step 138. The controller 32 receives the crank angle signal 34 from a crank angle sensor 36 provided to detect crank angle (in degrees) of a crankshaft of the engine 14. The controller 32 receives the speed signal 48 from a speed sensor 50 configured to detect speed of the engine 14. The controller 32 also receives a power signal 33 from a power sensor 35 configured to detect the discrete notch position of the power control mechanism 31. As discussed previously, the controller 32 is configured to produce the fuel injection signal 44 to control the operation of plurality of fuel injectors 42 based on the crank angle signal 34, the engine speed signal 48, and the power signal 33.

The controller determines a first predetermined time before the piston reaches the top dead center of the compression stroke of the engine 14 as represented by step 140. The controller 32 injects the first quantity of fuel (pilot fuel injection quantity) into the engine cylinder at the first predetermined time before the piston reaches top dead center position of the compression stroke as represented by step 142. For example, pilot fuel injection is performed when the piston position is in the range of 20 to 90 degrees before the top dead center of the compression stroke. In one example, pilot fuel injection quantity in the range of 1 to 5% of total fuel injection quantity may be injected into the engine cylinder before the top dead center of the compression stroke. The controller 32 determines a second predetermined time when the piston is proximate to the top dead center of the compression stroke of the engine 14 as represented by step 144. The controller 32 injects the second quantity of fuel (main fuel injection quantity) into the engine cylinder at the second predetermined time when the piston is proximate to the top dead center position of the compression stroke as represented by step 146. For example, main fuel injection may be performed when the piston position is in the range of less than 5 degrees before the top dead center of the compression stroke. Alternately, main fuel injection may be performed when the piston position is in the range of 5 degrees after the top dead center of the compression stroke. For example, main fuel injection quantity in the range of 95 to 99% of the total fuel injection quantity may be injected into the engine cylinder 24 when the piston position is in vicinity of the top dead center of the compression stroke.

In the illustrated embodiment, for low to intermediate power levels of the engine 14, the controller 32 determines the crank angle and engine speed as represented by step 148. The controller determines a predetermined time when the piston is proximate the top dead center of the compression stroke of the engine 14 as represented by step 150. The controller 32 injects a plurality of substantially equal duration injections into the engine cylinder at the first predetermined time when the piston is proximate to top dead center position of the compression stroke as represented by step 152. The controller 32 performs the second fuel injection schedule i.e. the plurality of substantially equal duration injections into the engine cylinder at a predetermined time during the second half of a compression stroke when the piston of the engine cylinder is proximate to the top dead center of the compression stroke. Each substantially equal duration injection may be performed at performed at predetermined intervals. In one example, three substantially equal duration injections of fuel are performed at a predetermined time during the second half of a compression stroke when the piston of the engine cylinder is proximate to the top dead center of the compression stroke.

Figure 8:
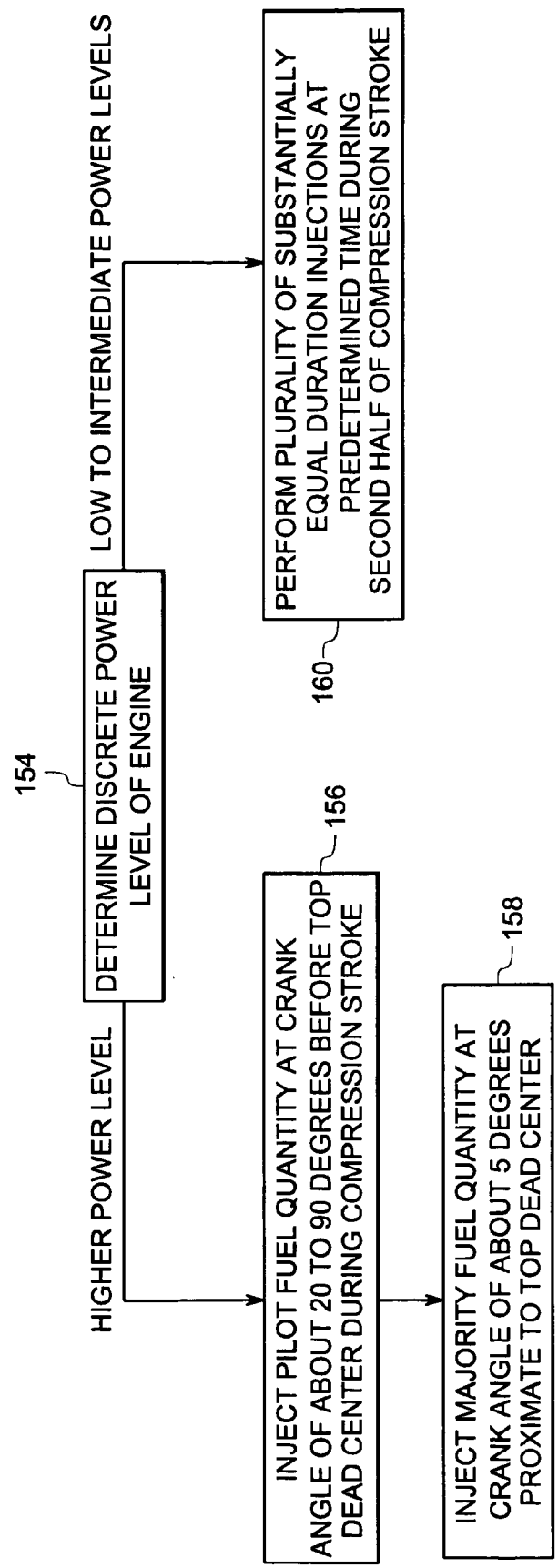
FIG. 8 is a flow chart illustrating an embodiment of a process of controlling engine exhaust emission and specific fuel consumption within a turbocharged engine.

Referring to FIG. 8, this figure is a flow chart illustrating one embodiment of a process of controlling engine exhaust emission and specific fuel consumption within a turbocharged engine in accordance with an exemplary aspect of the present technique. In the illustrated embodiment, the controller 32 determines the power level of the engine based on the power signal 33 from the power sensor 35 configured to detect the discrete notch position of the power control mechanism 31 as represented by step 154. The controller 32 determines the first discrete power level of the engine corresponding to a discrete notch position in a mid to upper range of the plurality of notches of the power control mechanism or the second discrete power level of the engine corresponding to a discrete notch position in a low to mid range of the plurality of notches of the power control mechanism.

For higher power levels of the engine 14, the controller 32 receives the crank angle signal 34 from a crank angle sensor 36 provided to detect crank angle (in degrees) of a crankshaft of the engine 14 and the speed signal 48 from a speed sensor 50 configured to detect speed of the engine 14. The controller 32 is configured to produce the fuel injection signal 44 to control the operation of plurality of fuel injectors 42 based on the crank angle signal 34, the engine speed signal 48, and the power signal 33. In the illustrated embodiment, the controller 32 injects pilot fuel injection quantity into the engine cylinder, when the piston position is in the range of 20 to 90 degrees before the top dead center of the compression stroke as represented by step 156. In one example, pilot fuel injection quantity in the range of 1 to 5% of total fuel injection quantity may be injected into the engine cylinder before the top dead center of the compression stroke. The controller 32 injects the main fuel injection quantity into the engine cylinder, when the piston position is in the range of less than 5 degrees before the top dead center of the compression stroke as represented by step 158. Alternately, the controller injects the main fuel quantity into the engine cylinder, when the piston position is in the range of about 5 degrees after the top dead center of the compression stroke. For example, main fuel injection quantity in the range of 95 to 99% of the total fuel injection quantity may be injected into the engine cylinder 24 when the piston position is in vicinity of the top dead center of the compression stroke. As a result, nitrogen oxide emissions or specific fuel consumption are reduced.

In the illustrated embodiment, for low to intermediate power levels of the engine 14, the controller 32 receives the crank angle signal 34 from a crank angle sensor 36 provided to detect crank angle (in degrees) of a crankshaft of the engine 14 and the speed signal 48 from a speed sensor 50 configured to detect speed of the engine 14. The controller 32 is configured to produce the fuel injection signal 44 to control the operation of plurality of fuel injectors 42 based on the crank angle signal 34, the engine speed signal 48, and the power signal 33. The controller 32 performs the plurality of substantially equal duration injections into the engine cylinder at a predetermined time during the second half of a compression stroke when the piston of the engine cylinder is proximate the top dead center of the compression stroke as represented by step 160. Each substantially equal duration injection is performed at predetermined intervals. In one example, three substantially equal duration injections of fuel are performed at a predetermined time during the second half of a compression stroke when the piston of the engine cylinder is proximate to the top dead center of the compression stroke. As a result, particulate emissions are reduced.

Figure 9:
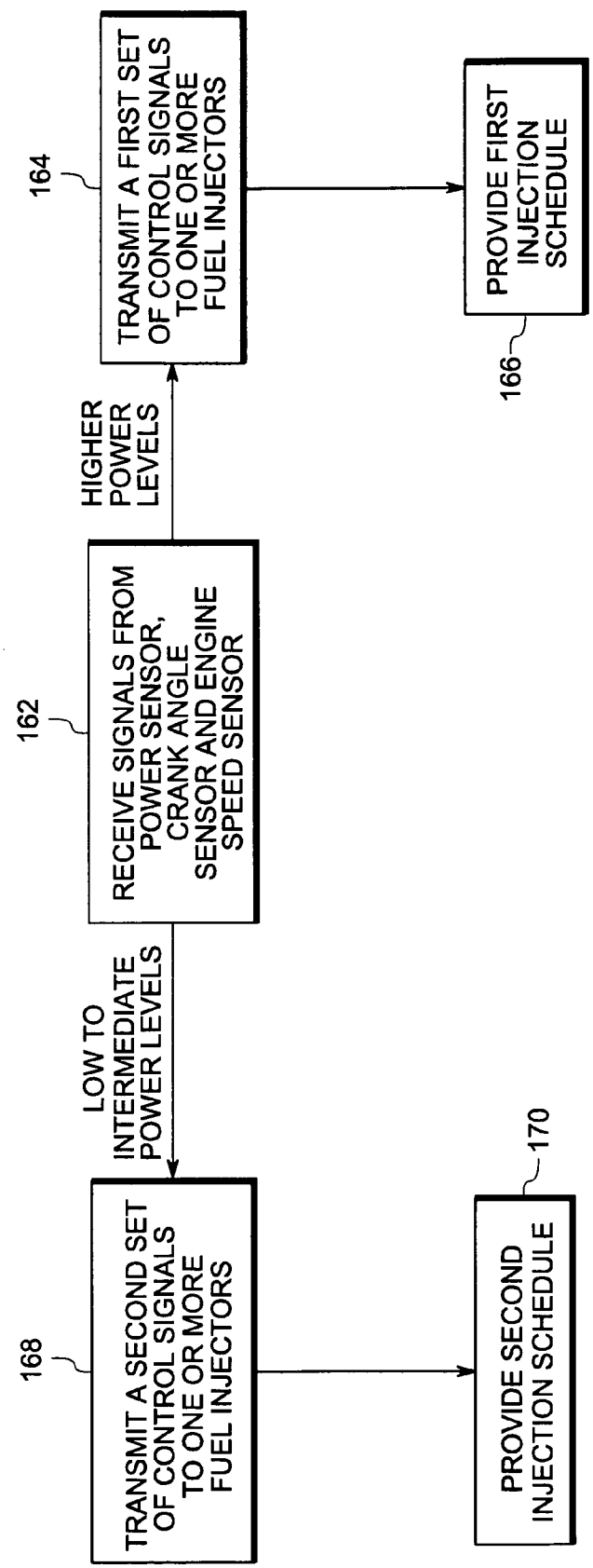
FIG. 9 is a flow chart illustrating an embodiment of a process of operating a controller of a turbocharged engine.

Referring to FIG. 9, this figure is a flow chart illustrating one embodiment of a process of operating the controller of the turbocharged engine in accordance with an exemplary aspect of the present technique. The method includes receiving the crank angle signal 34 from the crank angle sensor 36, the speed signal 48 from the speed sensor 50 configured to detect speed of the engine 14, a power signal 33 from a power sensor 35 configured to detect the discrete notch position of the power control mechanism 31. The controller 32 determines the power level of the engine based on the power signal 33 from the power sensor 35 configured to detect the discrete notch position of the power control mechanism 31 as represented by step 162. The controller 32 determines the first discrete power level of the engine corresponding to a discrete notch position in a mid to upper range of the plurality of notches of the power control mechanism or the second discrete power level of the engine corresponding to a discrete notch position in a low to mid range of the plurality of notches of the power control mechanism.

For higher power levels of the engine 14, the method includes transmitting a first set of control signals to one or more fuel injectors as represented by step 164. The controller 32 is configured to produce the fuel injection signal 44 to control the operation of plurality of fuel injectors 42 based on the crank angle signal 34, the engine speed signal 48, and the power signal 33. The controller 32 provides a first injection schedule as represented by step 166. In the illustrated embodiment, the controller 32 injects pilot fuel injection quantity into the engine cylinder, when the piston position is in the range of 20 to 90 degrees before the top dead center of the compression stroke. In one example, pilot fuel injection quantity in the range of 1 to 5% of total fuel injection quantity may be injected into the engine cylinder before the top dead center of the compression stroke. The controller 32 injects the main fuel injection quantity into the engine cylinder, when the piston position is in the range of less than 5 degrees before the top dead center of the compression stroke or 5 degrees after the top dead center of the compression stroke. For example, main fuel injection quantity in the range of 95 to 99% of the total fuel injection quantity may be injected into the engine cylinder 24 when the piston position is in vicinity of the top dead center of the compression stroke. As a result, nitrogen oxide emissions or specific fuel consumption are reduced.

In the illustrated embodiment, for low to intermediate power levels of the engine 14, the method includes transmitting a second set of control signals to one or more fuel injectors as represented by step 168. The controller 32 is configured to produce the fuel injection signal 44 to control the operation of plurality of fuel injectors 42 based on the crank angle signal 34, the engine speed signal 48, and the power signal 33. The controller 32 provides a second injection schedule as represented by step 170. The controller 32 performs the plurality of substantially equal duration injections into the engine cylinder at a predetermined time during the second half of a compression stroke and when the piston of the engine cylinder is proximate to the top dead center of the compression stroke. In one example, three substantially equal duration injections of fuel are performed at a predetermined time during the second half of a compression stroke and when the piston of the engine cylinder is proximate the top dead center of the compression stroke. As a result, particulate emissions are reduced.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
providing a first fuel injection schedule having one or more injections per cylinder per compression stroke at a first discrete power level selected from a plurality of discrete power levels of an engine; and
providing a second fuel injection schedule having a plurality of injections per cylinder per compression stroke at a second discrete power level selected from the plurality of discrete power levels of the engine, wherein the first and second fuel injection schedules comprise different injection characteristics from one another.

2. The method of claim 1, wherein providing the first injection schedule comprises transmitting a first set of control signals to one or more fuel injectors, and providing the second fuel injection schedule comprises transmitting a second set of control signals to the one or more fuel injectors.

3. The method of claim 1, wherein the different injection characteristics comprise quantity of fuel injections per cylinder per compression stroke, or injection pressure, or timing of each one of the fuel injections, or duration of each one of the fuel injections, or a combination thereof.

4. The method of claim 1, wherein providing the first fuel injection schedule comprises splitting fuel injection into a pilot injection followed by a majority injection, and providing the second fuel injection schedule comprises splitting fuel injection into a plurality of substantially equal fuel injections.

5. The method of claim 4, wherein the first discrete power level is a generally high to intermediate level in the plurality of discrete power levels, and the second discrete power level is a generally intermediate to low level in the plurality of discrete power levels.

6. The method of claim 1, wherein providing the first fuel injection schedule comprises:
injecting a first quantity of fuel into an engine cylinder at a first predetermined time during a second half of a compression stroke before a piston of the engine cylinder reaches top dead center of the compression stroke; and
injecting a second quantity of fuel into the engine cylinder at a second predetermined time after the first predetermined time when the piston is advanced or retarded by a predetermined value and the piston is proximate the top dead center of the compression stroke.

7. The method of claim 6, wherein the first predetermined time corresponds with a crank angle of about 20 to 90 degrees before top dead center of the compression stroke, and the second predetermined time corresponds with a crank angle of about 5 degrees proximate to the top dead center of the compression stroke.

8. The method of claim 6, wherein injecting the first quantity of fuel comprises injecting a pilot fuel quantity of about 1 to 5 percent of a total fuel quantity, and injecting the second quantity of fuel comprises injecting a majority fuel quantity of about 95 to 99 percent of the total fuel quantity.

9. The method of claim 1, wherein providing the second fuel injection schedule comprises performing a plurality of substantially equal duration injections of fuel into an engine cylinder at a predetermined time during a second half of a compression stroke when a piston of the engine cylinder is proximate to the top dead center of a compression stroke.

10. The method of claim 1, wherein providing the first and second fuel injection schedules comprises variably controlling fuel injection of a compression-ignition engine.

11. A method, comprising:
performing a first injection schedule of a fuel injection into an engine cylinder at a first discrete power level of an engine to reduce specific fuel consumption, or nitrogen oxide emissions, and
performing a second injection schedule of the fuel injection into the engine cylinder at a second discrete power level of the engine to reduce particulate matter emissions.

12. The method of claim 11, wherein performing the first injection schedule comprises injecting a pilot fuel quantity at a crank angle of about 20 to 90 degrees before top dead center of a compression stroke and injecting a majority fuel quantity at a crank angle of about 5 degrees proximate to the top dead center of the compression stroke.

13. The method of claim 11, wherein performing the second injection schedule comprises performing a plurality of substantially equal duration injections of fuel into the engine cylinder at a predetermined time during a second half of a compression stroke when a piston of the engine cylinder is proximate to the top dead center of the compression stroke.

14. The method of claim 11, wherein the first discrete power level of the engine comprises a power level corresponding to a discrete notch position of a power control mechanism in a mid to upper range of a plurality of notches of the power control mechanism, and
the second discrete power level of the engine comprises another power level corresponding to another discrete notch position of the power control mechanism in a low to mid range of the plurality of notches.

15. A system, comprising:
a controller configured to perform a first injection schedule of a fuel injection into an engine cylinder at a first discrete power level of an engine and, configured to perform a second injection schedule of the fuel injection into the engine cylinder at a second discrete power level of the engine.

16. The system of claim 15, wherein the first injection schedule comprises a pilot injection followed by a majority injection per cylinder per compression stroke, and the second injection schedule comprises a plurality of substantially equal fuel injections per cylinder per compression stroke.

17. The system of claim 15, wherein the controller is configured to inject a first quantity of fuel into the engine cylinder at a first predetermined time during a second half of a compression stroke before a piston of the engine cylinder reaches top dead center of the compression stroke at the first discrete power level, and
the controller is configured to inject a second quantity of fuel into the engine cylinder at a second predetermined time after the first predetermined time when the piston is advanced or retarded by a predetermined value and the piston is proximate to the top dead center of the compression stroke at the first discrete power level.

18. The system of claim 15, wherein the controller is configured to perform a plurality of substantially equal duration injections of fuel into the engine cylinder at a predetermined time during a second half of a compression stroke when a piston of the engine cylinder is proximate to the top dead center of the compression stroke at the second discrete power level.

19. The system of claim 15, comprising a power sensor, a crank angle sensor, and an engine speed sensor coupled to the controller and configured to detect engine power, crank angle, and engine speed, respectively.

20. The system of claim 19, wherein the controller is configured to perform the first injection schedule, or the second injection schedule, or both, based on sensed values of engine power, crank angle, and engine speed.

21. The system of claim 15, comprising a compression-ignition engine having the controller.

22. The system of claim 21, comprising a vehicle having the compression-ignition engine and the controller coupled to the compression-ignition engine.

23. A system comprising:
a compression-ignition engine;
a power control mechanism comprising a plurality of discrete notches; and
a fuel-injection system coupled to the compression-ignition engine, wherein the fuel-injection system is configured to inject a pilot fuel amount followed by a majority fuel amount per cylinder per compression stroke at a first discrete notch of the plurality of discrete notches, and configured to inject a plurality of substantially equal fuel amounts per cylinder per compression stroke at a second discrete notch of the plurality of discrete notches, wherein the first discrete notch is higher than the second discrete notch.

24. The system of claim 23, wherein the system comprises a vehicle having the compression-ignition engine, the power control mechanism, and the fuel-injection system.

25. The system of claim 23, wherein the pilot fuel amount is less than about 10 percent of a total fuel amount per cylinder per compression stroke, the majority fuel amount is greater than about 90 percent of the total fuel amount.

* * * * *

UNITED STATES PATENT AND TRADEMARK OFFICE
CERTIFICATE OF CORRECTION

PATENT NO.        : 7,360,522 B2                                             Page 1 of 1
APPLICATION NO.   : 11/492237
DATED             : April 22, 2008
INVENTOR(S)       : Tamma et al.

It is certified that error appears in the above-identified patent and that said Letters Patent is hereby corrected as shown below:

On the Title Page, in Field (56), under "FOREIGN PATENT DOCUMENTS", in Column 2, Line 11, delete "JP    1 223 329 A2*    12/2001" and insert -- EP    1 223 329 A2* 12/2001 --, therefor.

Signed and Sealed this

Third Day of March, 2009

JOHN DOLL
*Acting Director of the United States Patent and Trademark Office*